April 18, 1950        J. D. TEAR        2,504,604
STABLE VERTICAL MECHANISM

Filed July 1, 1944        2 Sheets-Sheet 1

INVENTOR
JAMES D. TEAR

ATTORNEY

April 18, 1950  J. D. TEAR  2,504,604
STABLE VERTICAL MECHANISM
Filed July 1, 1944  2 Sheets-Sheet 2
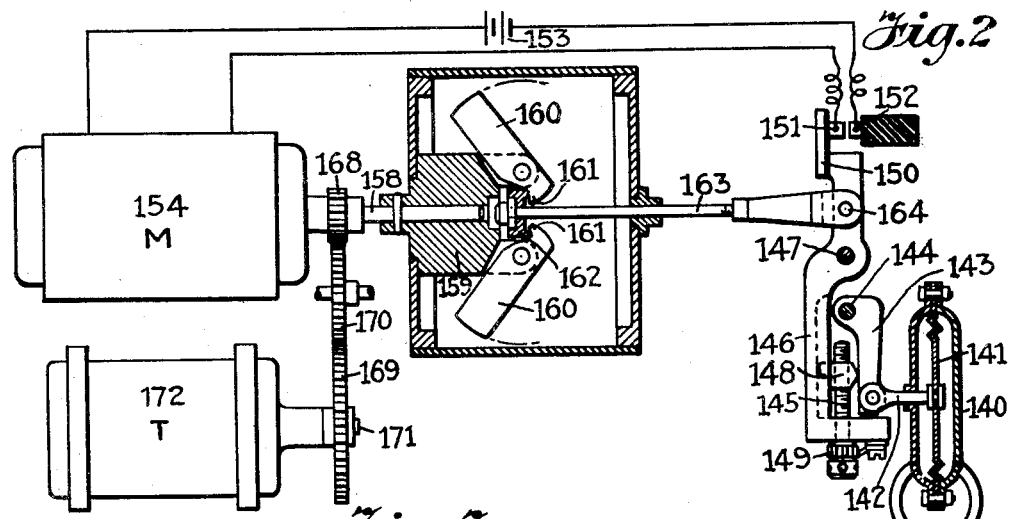
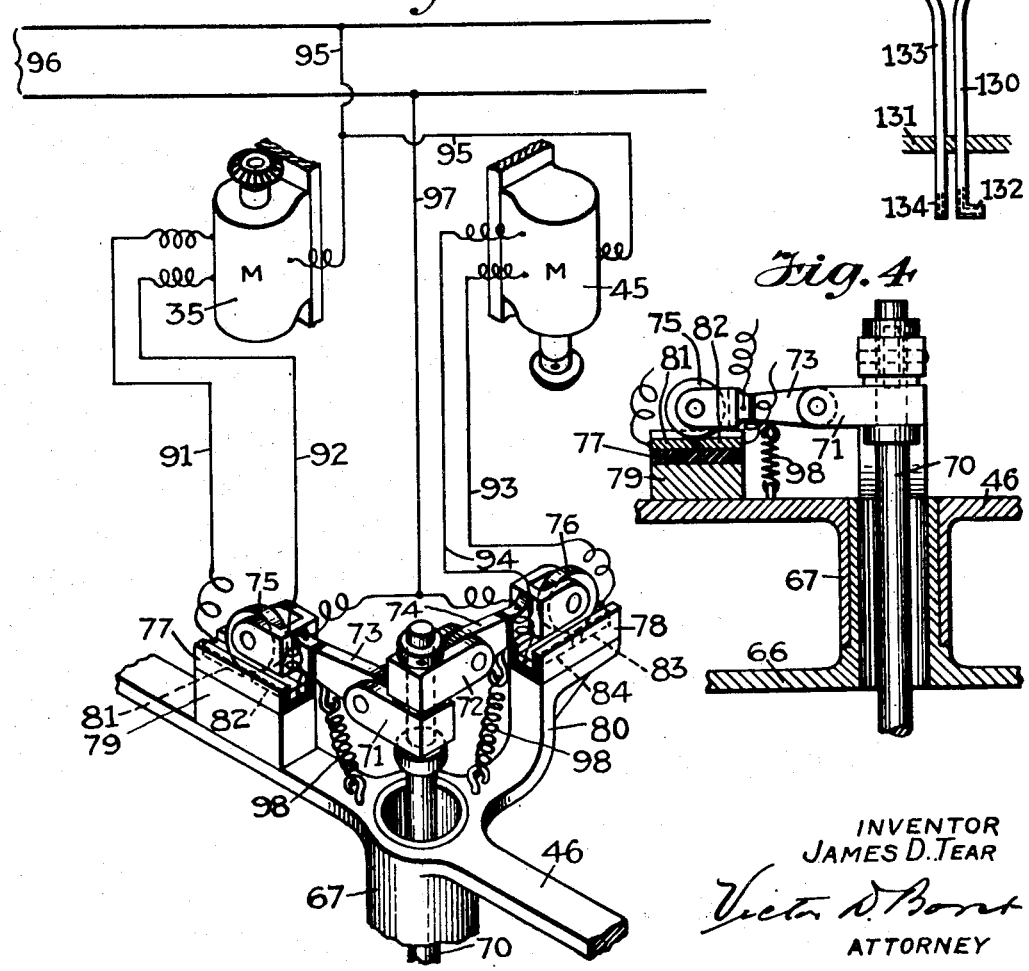
INVENTOR
JAMES D. TEAR
ATTORNEY Patented Apr. 18, 1950

2,504,604

UNITED STATES PATENT OFFICE 2,504,604

STABLE VERTICAL MECHANISM

James D. Tear, Great Neck, N. Y., assignor to The Sperry Corporation, a corporation of Delaware Application July 1, 1944, Serial No. 543,074

3 Claims. (Cl. 74—5.4)

This invention relates to a stabilized level and cross level mechanism for ships and more particularly to such mechanism under the control of a compensated level gyroscope having its mounting axes fixed with respect to the fore-and-aft axis of the ship.

An object of the invention is to provide a novel and improved mechanism of the type above indicated.

Another object is to provide an improved compensating mechanism in a device of the above type.

Various other objects and advantages will be apparent as the nature of the invention is more fully disclosed.

In one embodiment of the present invention as applied to a stable vertical having a gyro with erecting pendulums mechanically connected to maintain the gyro spin axis vertical, I compensate for the disturbing effect on the pendulums of acceleration, both due to change of speed and due to turning of the ship, by a motor driven inertia wheel mounted on the gyro housing with its axis fixed relative to the fore-and-aft axis of the ship and driven at a speed proportional to the forward speed of the ship. In this construction the reaction torque of the inertia wheel to changes in speed produces a force which opposes and compensates for the force due to the effect upon the pendulums of forward acceleration, and the gyroscopic effect of the inertia wheel during changes in course produces a precession torque which opposes and compensate for the force due to the effect upon the pendulums of transverse acceleration corresponding to change in course. In this way a single inertia wheel is utilized for complete compensation of the forces due to acceleration acting on the pendulums.

This invention is an improvement on that disclosed in a co-pending application of Poitras and Tear for Vertical-seeking gyro, filed Sept. 27, 1937, Ser. No. 165,934, now Patent No. 2,427,158.

Although the novel features which are believed to be characteristic of this invention are pointed out more particularly in the claims appended hereto, the invention itself may be better understood by referring to the following description, taken in connection with the accompanying drawings, in which a specific embodiment thereof has been set forth for purposes of illustration.

In the drawings:

Fig. 2 is a diagrammatic view of the mechanism for driving the inertia wheel at a speed proportional to the forward speed of the ship;

Fig. 3 is a detail view of the control mechanism for the level and cross level motors; and Fig. 4 is a partial section through one pair of control contacts.

Figure 1:
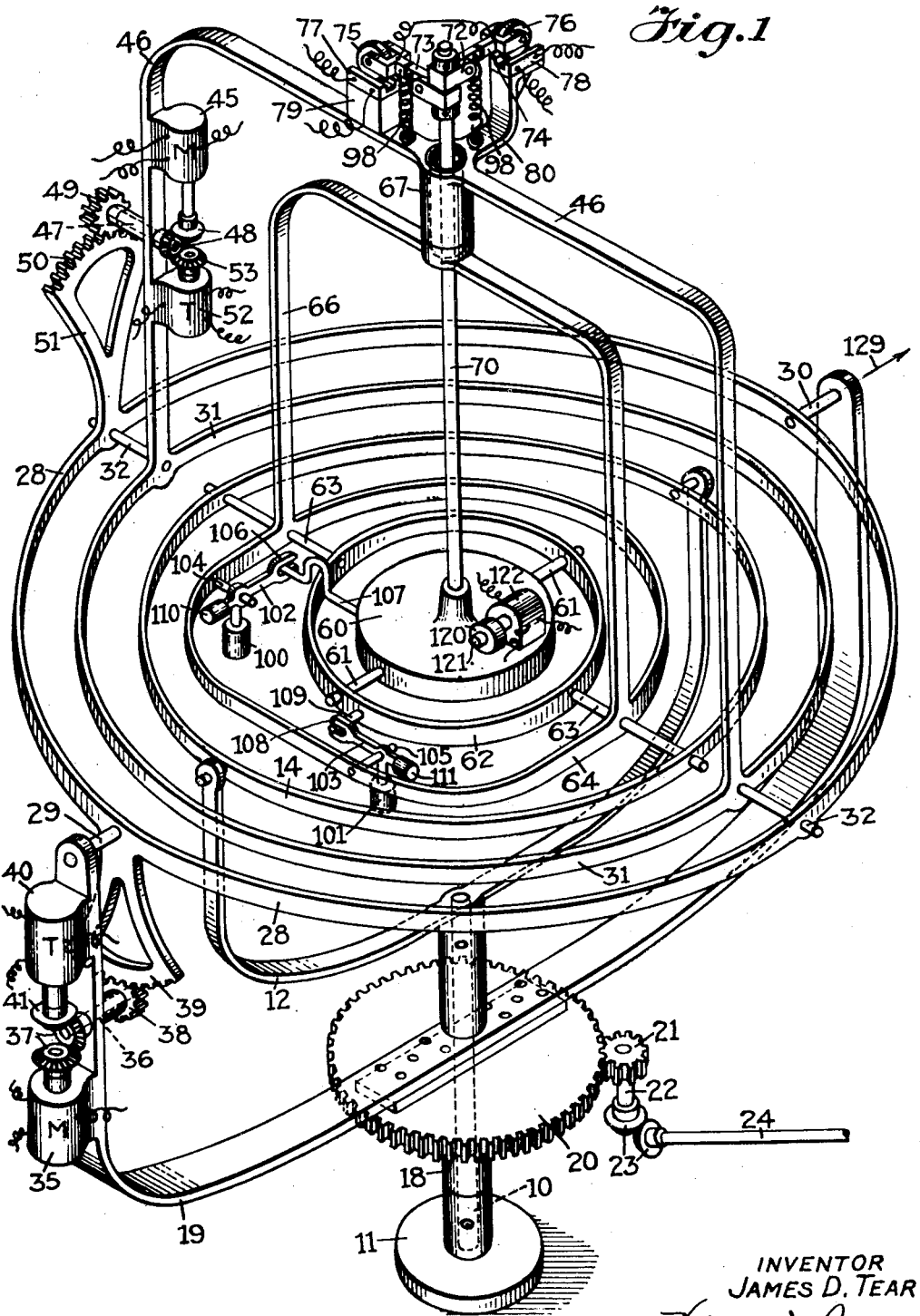
Fig. 1 is a diagrammatic view of a stabilized level and cross-level mechanism embodying the present invention.

Referring to the drawings more in detail, particularly to Fig. 1, a pedestal 10 is shown as mounted on a base 11 which is attached to the ship in a fixed position and carries a fixed bracket 12, which, in the embodiment shown, is assumed to be positioned in the fore and aft plane of the ship and carries a roll gimbal 14 which is pivoted to the bracket 12 for relative movement in roll, but is fixed to move with the bracket 12 in pitch.

A sleeve 18 is journalled for rotational movement about the pedestal 10. The sleeve 18 carries a train bracket 19 which is mounted to be movable in train and has attached thereto a gear 20 driven by a pinion 21 mounted on a shaft 22 which is driven through bevelled gears 23 from a train input sraft 24. The train input shaft 24 is actuated by any suitable means to follow the bearing of a target and produces a corresponding movement of the train bracket 19.

The train bracket 19 carries a cross level ring 28 which is mounted on pivot pins 29 and 30 for movement in cross level with respect to the train bracket 19, but is constrained to move with the train bracket 19 in level. A stable ring 31 is pivoted to the cross level ring 28 by suitable means shown as pivot pins 32. The stable ring 31 is caused to remain horizontal by the means to be described.

The cross level ring 28 is power driven by a reversible motor 35 mounted on the train bracket 19 and driving a shaft 36 through bevelled gears 37. The shaft 36 carries a pinion 38 meshing with a segmental rack 39 attached to the cross level ring 28. The movement of the cross level ring is transmitted to a distant point for control purposes by means of a transmitter 40 which is mounted on the train bracket 19 and is driven by a bevelled gear 41 to reproduce the movement of the shaft 36.

The stable ring 31 is power driven by means of a motor 45 attached to a bail 46 carried by the stable ring 31 and driving a shaft 47 through bevelled gears 48. The shaft 47 carries a pinion 49 meshing with a segmental rack 50 formed on a bracket 51 attached to the cross level ring 28. The movement of the stable ring with respect to the cross level ring 28 is transmitted to a distant point for control purposes by a transmitter 52 which is mounted on the bail 46 and is driven by a bevelled gear 53 from the gear 48 on the shaft 47.

The motors 35 and 45 are controlled by a gyroscope 60 which is mounted by pivot pins 61 on a sensitive gimbal 62. The sensitive gimbal 62 is pivoted by pins 63 to a phantom gimbal 64 and to the roll gimbal 14 so that the gyroscope 60 is free to move in all directions with respect to the fixed bracket 12. The phantom gimbal 64 carries a bail 66 which is journalled for rotational movement in a sleeve 67 attached to the bail 46 so that the bails 46 and 66 move in unison except that the bail 46 may be rotated in train about the axis of the sleeve 67, whereas the bail 66 is fixed in train by means of the fixed bracket 12 and roll gimbal 14.

The axis of the sleeve 67 is aligned with the center of the gimbal system.

A rod 70 attached to the casing of the gyroscope 60 and fixed to coincide with the spin axis of the gyroscope, extends upwardly through the sleeve 67 and loosely carries at its upper end a pair of brackets 71 and 72 as shown in Fig. 3 to which are pivoted arms 73 and 74 respectively carrying contact rollers 75 and 76 respectively. The contact rollers 75 and 76 ride in channels 77 and 78 attached to brackets 79 and 80 carried by the bail 46. The channel 77 extends in the plane of the bail 46 whereas the channel 78 extends at right angles thereto. The roller 75 selectively makes contact with a pair of contact members 81 and 82 positioned in the channel 77 and the roller 76 selectively makes contact with a pair of contact members 83 and 84 positioned in the channel 78. The rollers 75 and 76 riding in the channels 77 and 78 cause the brackets 71 and 72 to turn with the bail 46 about the rod 70.

The contact members 81 and 82 are connected by conductors 91 and 92 to the cross level motor 35 above described. The contact members 83 and 84 are connected by conductors 93 and 94 to the level motor 45 above described. The return leads from the motors 35 and 45 are connected by conductor 95 to one side of a power supply line 96. The contact arms 73 and 74, carrying the rollers 75 and 76, are connected by a conductor 97 to the other side of the power supply line 96. The connections are such that the motors 35 and 45 are reversibly driven in a direction which tends to maintain the rollers 75 and 76 on the insulating segments between their respective contacts.

The rollers 75 and 76 on the arms 73 and 74 are held in contact with the contact members by means of springs 98 which extend between said arms and the bail 46. Sufficient clearance is provided in the sleeve 67 around the rod 70 to permit the relative movement required for control purposes.

The phantom gimbal 64 carries a pair of erecting pendulums 100 and 101 which carry arms 102 and 103 respectively and are pivoted on pivot pins 104 and 105 projecting from the phantom gimbal 64. The arm 102 is provided with a forked end 106 which engages a pin 107 attached to the housing of the gyroscope 60. The arm 103 is provided with a forked end 108 which engages a pin 109 attached to the sensitive gimbal 62. Counterweights 110 and 111 are provided for balancing the arms 102 and 103 and for adjusting the zero position of the pendulums 100 and 101.

The action of the erecting pendulums 100 and 101 is well known in the art and is such as to apply precessing forces to the gyroscope 60 suited to maintain the spin axis of the gyroscope substantially vertical at all times. It is to be understood that additional well-known correcting devices such as that shown in Whittkuhns, Patent 2,293,092, dated August 18, 1942, may be associated with the gyroscope 60 if desired for correcting the gyroscope for the effect of the rotation of the earth.

While the above described device provides a stable vertical which is suitable for many uses, it has been found, when extreme accuracy is desired, that the action of the pendulums 100 and 101 and the gyroscope 60 are disturbed by the effect of accelerations either in a fore and aft direction due to change in speed of the ship or in a transverse direction due to the turning of the ship. In accordance with the present invention, I have found that this disturbing effect may be compensated for by means of an inertia wheel 120 which is mounted on a shaft 121 and is driven by a motor 122 which is mounted on the housing or casing of the gyroscope 60 with the axis of the shaft 121 extending in a fore-and-aft direction. The motor 122 is driven at a speed proportional to the speed of the ship by means to be described, so that when the speed changes a reaction torque is developed which applies a torque to the casing of the gyroscope 60 in a direction to oppose the torque produced by the effect of said change in speed on the pendulum 100 as explained more in detail in the copending application of Poitras and Tear above identified.

The effect on the pendulum 101 of any turning motion of the ship is opposed by the gyroscopic effect of the inertia wheel 120 which produces a torque on the casing of the gyroscope 60 in a direction to oppose the torque produced by the effect of such turning movement on the pendulum 101. This operation may be explained as follows:

Assume the arrow 129 to indicate the direction of the bow of the ship and the inertia wheel 120 to be rotating in a counter-clockwise direction as viewed when looking toward the bow as in Fig. 1; the effect of positive acceleration, that is, an increase in speed of the ship, would tend to cause the pendulum 100 to swing backwardly and cause a downward movement of the arm 102 which tends to turn the gyroscope 60 in a counter-clockwise direction about the pivot pin 61. As will be explained, an increase in speed of the ship also produces a corresponding acceleration or increase in speed of the driving motor 122 which produces a reaction torque in a clockwise direction on the housing of the gyroscope 60 which opposes the torque due to the pendulum 100. By suitable design of the motor 122 and inertia wheel 120 with respect to the pendulum 100, these torques may be made equal and opposite so that the effect of forward acceleration on the pendulum and therefore on the gyroscope 60 is eliminated.

If the ship should turn to the right, for example, this movement tends to cause the pendulum 101 to swing to the left, thereby raising the arm 103 and applying an upward force to the pin 109 which is attached to the rear of the sensitive gimbal 62. However, when the shaft 121 is turned to the right by the movement of the ship, a precession torque is produced due to the gyroscopic effect of the reaction wheel 120 which tends to turn the rear of the sensitive gimbal 62 in a downward direction. When the design of the inertia wheel and motor 122 is correct to neutralize the effect of acceleration on the pendulum 100 the precession torque due to the inertia wheel will be equal and opposite to the torque produced by the inertia of the pendulum 101 so that the effect of transverse acceleration is likewise equalized. Hence, the spin axis of the gyroscope remains vertical and is unaffected by acceleration in any direction.

It will be noted that the rotational movement of the train bracket 19 due to changes in bearing of the target is not transmitted to the gyroscope which is fixed in a fore-and-aft position by the fixed bracket 12. Hence no disturbing force is introduced to the gyroscope and its associated mechanism by this movement of the train bracket and the rod 70 thus stays vertical at all times.

Any relative movement between the rod 70 and the ball 46 in the plane of the contact arms 73 and 74 causes the rollers 75 and 76 to energize the corresponding contact member and thereby actuate the cross lever motor 35 or the level motor 45 so as to drive the cross level ring 28 and the stable ring 31 in a direction to bring the insulation between the respective contact members under the rollers 75 and 76. The stable ring 31 is thus caused to follow the movement of the gyroscope 60 and to remain in a horizontal position. The phantom gimbal 64 which moves with the stable ring 31, due to the connection through the sleeve 67, maintains a horizontal position under the control of the gyroscope 60.

The mechanism for driving the motor 122 at a speed proportional to the speed of the ship is shown in Fig. 2. Referring to this figure, a dynamic pressure tube 130 is shown as extending through the hull 131 into the surrounding water and is provided with a forwardly directed orifice 132. A static pressure tube 133 likewise extends through the hull 131 and is provided with a lateral orifice 134. The dynamic pressure tube 130 and the static pressure tube 133 connect with chambers formed in a casing 140 on opposite sides of a flexibly mounted diaphragm 141 and are arranged to apply unbalanced pressure forces on the diaphragm 141 which are dependent upon the speed of the ship.

Movement of the diaphragm 141 due to the unbalanced forces is transmitted by a link 142 to an arm 143 which is pivoted at one end by a fixed pin 144. The arm 143 actuates a second arm 146 which is pivoted by a fixed pin 147 and carries a slide 148 which is adjustable along the arm 146 by means of a threaded screw 145 and is provided with a surface engaging the arm 143. Consequently, the ratio of movement of the arms 143 and 146 may be controlled by adjusting the slide 148 and thereby varying the point of contact of the slide with the arm 143.

The arm 146 carries a lug 150 to which an insulated contact 151 is attached. This contact 151 cooperates with a stationary contact 152 to close a circuit from a power source 153 to a motor 154.

The motor 154 drives a shaft 158 carrying a support 159 to which inertia weights 160 are pivotally mounted to swing outwardly by centrifugal force as the shaft 158 rotates.

The inertia weights 160 are provided with shoulders 161 which engage a collar 162 attached to link 163 which is pivoted at 164 to the arm 146 and is arranged so that the force produced by the centrifugal force acting upon the weights 160 causes the link 163 to move the arm 146 in a direction to open the contacts 151 and 152 and to oppose the unbalanced force exerted by the pressures acting on the diaphragm 141.

The pressure on the diaphragm 141 from the tube 130 tends to move the diaphragm 141 in a direction to close the contacts 151, 152 and thereby cause the motor 154 to operate. Operation of the motor 154 causes the inertia weights 160 to swing outwardly and thereby exert a force on the link 163 and arm 146 which opposes the force exerted by the diaphragm 141. When the force exerted by the inertia weights 160 equals the force exerted by the diaphragm 141, the contacts are again opened and the motor begins to slow down. As the motor slows down, the force exerted by the inertia weights 160 is reduced, thereby allowing the contacts to again close and cause the motor to speed up. In this way, by rapidly opening and closing the contacts, the motor 154 is caused to operate at a speed which is controlled by unbalanced pressures on the diaphragm 141 due to the forward movement of the vessel. It is to be noted that the pressure device, including the diaphragm 141, operates on the square law principle. The inertia weights 160 likewise operate on the square law principle. Hence the square law effects cancel out and the motor 154 is caused to operate at a speed which is directly proportional to the forward speed of the ship.

The motor 154 carries a pinion 168 which drives a gear 169 through an idler 170. The gear 169 is mounted on the shaft 171 of a synchronous transmitter 172 which is connected to drive the motor 122 of Fig. 1. The synchronous transmitter 172 and the motor 122 are designed so that the motor 122 operates at a speed which is dependent upon the speed of the synchronous transmitter 172. Consequently, the motor 122 at all times maintains a speed proportional to the forward speed of the ship.

While the bracket 12 has been described as fixed parallel to the fore-and-aft axis of the ship, it is to be understood that this bracket may take other positions, in which event, the pendulums 100 and 101 will be acted upon by their respective components of the forward acceleration and transverse acceleration. While two pendulums are shown, an erecting system using one universally mounted pendulum may be used. The axis of the shaft 121 must, however, be fixed relative to the pendulum or pendulums so that the reaction torques due to the inertia wheel 120 during change of speed of the ship will oppose and neutralize the torque resulting from the acceleration force acting on the pendulum or pendulums due to the change of speed of the ship and the gyroscopic precession torque resulting from the inertia wheel 120 will oppose and neutralize the torque resulting from the centrifugal force acting on the pendulum or pendulums due to change of course of the ship.

It is to be understood that the inertia wheel and driving means may be mounted on or directly connected to the pendulums if desired, or may be used to stabilize pendulums entirely apart from a gyroscope control device.

Although a specific embodiment of the invention has been shown for purposes of explanation, it is to be understood that the invention is not to be restricted thereto, but is capable of various uses and adaptations as will be readily apparent to a person skilled in the art. The invention is only to be restricted in accordance with the scope of the following claims.

What is claimed is:

1. In a stabilized mechanism for use on ships, a stable member having an erecting pendulum to maintain said member in a stable position, means supporting the stable member on the ship for pivotal movement about axes having a fixed angular relation in train to the fore-and-aft axis of the ship, an inertia wheel and a synchronous driving motor therefor mounted on said stable member with their axes of rotation fixed in train with respect to the axes of the supporting means, a pressure actuated member responsive to the forward movement of the ship, a motor control member connected to be actuated in response to the force exerted by said pressure actuated member, a motor connected to be energized by said motor control member, means driven by said motor for generating a force representative of the speed of said motor, means applying said generated force to oppose the force exerted by said pressure actuated member, a synchronous transmitter driven by said motor, and means connecting the synchronous motor to be driven by said synchronous transmitter.

2. In a pendulous mechanism for use on a moving platform, a pendulous element, means supporting the pendulous element on the platform for pivotal movement about axes having fixed predetermined angular relation in train to the axis of movement of the platform, an inertia wheel mounted on the pendulous element with its spin axis of rotation fixed in train in relation to the axes of the supporting means, and means reacting on the pendulous element for driving the inertia wheel about its spin axis at a speed proportional to the speed of the platform, whereby the torques due to changes of speed of the inertia wheel oppose the disturbing torques acting on the pendulous element due to the corresponding changes of speed of the platform and the torques due to the gyroscopic effect of the inertia wheel due to changes in direction of movement of the platform oppose the disturbing torques acting on the pendulous element due to said changes in direction of movement of the platform.

3. In a stabilized mechanism for use on a craft including a pendulum, means supporting the stabilized mechanism on the craft for pivotal movement about axes having fixed predetermined angular relation in train to the fore-and-aft axis of the craft, and means compensating for the effect of acceleration on said pendulum comprising an inertia wheel and driving means therefor mounted with their spin axes in fixed angular relation in train to the axes of the supporting means, means rotating said inertia wheel and driving means about their spin axes at a speed proportional to the speed of the craft, and means operably connecting said inertia wheel and driving means to the pendulum to apply the reaction torque of the driving means to oppose the effect of acceleration of the craft on said pendulum and to apply the torque due to the gyroscopic effect of the inertia wheel during turning of the craft to oppose the effect on said pendulum of transverse acceleration due to said turning.

JAMES D. TEAR.

REFERENCES CITED

The following references are of record in the file of this patent:

UNITED STATES PATENTS

| Number | Name | Date |
|---|---|---|
| 1,579,038 | Smoot | Mar. 20, 1926 |
| 1,679,354 | Fairchild et al. | Aug. 7, 1928 |
| 1,731,776 | Henry | Oct. 15, 1929 |
| 1,840,104 | Anschutz-Kaempfe | Jan. 5, 1932 |
| 1,932,210 | Glitscher | Oct. 24, 1933 |
| 2,297,274 | Wunsch | Sept. 29, 1942 |
| 2,332,611 | Spencer | Oct. 26, 1943 |
| 2,382,993 | Haskins Jr. | Aug. 21, 1945 |

FOREIGN PATENTS

| Number | Country | Date |
|---|---|---|
| 530,764 | Germany | Aug. 1, 1931 |